No. 817,621. PATENTED APR. 10, 1906
A. BOAS & C. RODRIGUES-ELY.
APPARATUS FOR REFLECTING AND DIRECTING LIGHT
APPLICATION FILED JAN. 30, 1905.
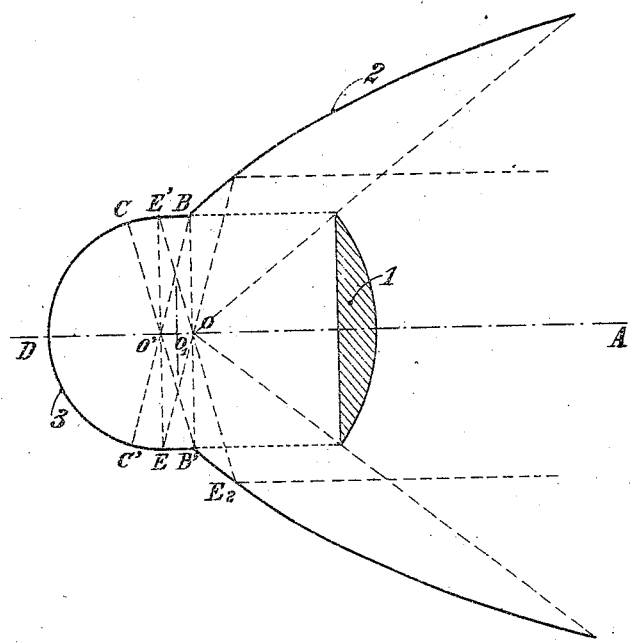

UNITED STATES PATENT OFFICE.

ALFRED BOAS AND CAMILLE RODRIGUES-ELY, OF PARIS, FRANCE.

APPARATUS FOR REFLECTING AND DIRECTING LIGHT.

No. 817,621.     Specification of Letters Patent.     Patented April 10, 1906.

Application filed January 30, 1905. Serial No. 243,420.

*To all whom it may concern:*

Be it known that we, ALFRED BOAS and CAMILLE RODRIGUES-ELY, engineers, citizens of the French Republic, residing at Paris, France, have invented certain new and useful Improvements in Apparatus for Reflecting and Directing Light, of which the following is a specification.

This invention relates to a reflector for extended luminous sources formed by two burners, and has for its object to provide a reflector in which an amount as great as possible of luminous rays emitted by the sources of light issue in a parallel direction with the axis of this reflector.

The new reflector is constituted by a planoconvex lens, a parabolic mirror, and an elliptic mirror, which are disposed in order that the focus of the paraboloid, the focus of the lens, and the fore focus of the ellipsoid coincide.

Reflectors are known having a lens, a parabolic and a spherical mirror in which the focus of the paraboloid, the focus of the lens, and the center of the sphere coincide. With such a reflector and with a source of light reduced to a point and placed at the focus the totality of the luminous rays issue in a parallel direction with the axis of this reflector. If such a reflector be used with two sources of light, one at the focus and the other behind or before it, the totality of the luminous rays emitted by the source placed at the focus— *i. e.*, fifty per cent. of the total light—would issue in a parallel direction with the axis of the reflector. The rays emitted by the other source—*i. e.*, fifty per cent. of the total light— would issue in a convergent or divergent direction.

According to the invention, in these reflectors an elliptic mirror is substituted to the spherical one. The two sources of light are placed on the two foci of the ellipsoid, the fore one coinciding with the focus of the paraboloid and of the lens. By this arrangement the amount of rays which issue in a parallel direction with the axis of the reflector is greatly increased.

In the drawing is shown diametrically a section through the axis of a reflector in accordance with this invention.

The reflector comprises a plano-convex lens 1, a mirror 2, having the shape of a paraboloid, and a mirror 3, having the shape of an ellipsoid.

The focus O of the lens, the focus of the paraboloid, and the fore focus of the ellipsoid coincide. The ellipsoid and the paraboloid intersect according to a circle having the same diameter as the lens and situated in a plane perpendicular to the axis of the apparatus and passing through the focus O of the paraboloid. The part of the ellipsoid which would be before this plane is suppressed, as well as the part of the paraboloid which is behind this plane.

The sources of light are disposed at the two foci O O' of the ellipsoid. The luminous rays emitted by the source O at the right of B B' strike the paraboloid or the lens and issue in a parallel direction with the axis O A. A luminous ray O E, for instance, emitted by the source O at the left of B B' between B C or B' C' strikes the ellipsoid, returns to the focus O', strikes again the ellipsoid in E', is again reflected, passes through the focus O, and finally strikes the paraboloid at E² or the lens. This ray issues from the apparatus in a parallel direction with the axis O A. The rays emitted from the source O in the rear part C D C' strike only once the ellipsoid, return through the focus O', and strike the paraboloid or the lens without passing again through their focus O. They issue from the apparatus either converging or diverging. The rays emitted by the source O in the rear part C D C'—*i. e.*, about thirty per cent. of the light emitted by the source O and fifteen per cent. of the total light—do not issue in a parallel direction with O A. The rays emitted by the source O' at the rear of B B' strike the ellipsoid, are reflected once, pass through the focus O, strike the paraboloid or the lens, and issue in a parallel direction with O A. The other rays emitted by O'—*i. e.*, about forty per cent. of the light emitted by the source O' and twenty per cent. of the total light—strike directly the paraboloid or the lens and issue either diverging or converging. Thus sixty-five per cent. of the rays issue in a parallel direction with the axis O A.

Having thus fully described our invention, what we claim as new, and desire to secure by Letters Patent, is—

A reflector for extended luminous sources formed by two sources of light, said reflector comprising a mirror paraboidal in contour, a plano-convex lens, a mirror ellipsoidal in contour and having the two sources of light located at the foci thereof, the said mirrors intersecting each other on a circle of a diameter equal to that of the lens, the plane of the said circle passing through the front source of light.

In testimony whereof we have hereunto set our hands in presence of two subscribing witnesses.

ALFRED BOAS.
CAMILLE RODRIGUES-ELY.

Witnesses:
HIPPOLYTE JOTTEL,
PAUL BLUM.